United States Patent Office 3,442,924
Patented May 6, 1969

3,442,924
PROCESS FOR THE PREPARATION OF MIXED ALKYL LEAD COMPOUNDS
Shinichi Imura and Masaru Yamanaka, Tsuno-gun, Yamaguchi-ken, Japan, assignors, by mesne assignments, to Toyo Ethyl Kabushiki Kaisha, Tokyo, Japan, a corporation of Japan
No Drawing. Filed Dec. 9, 1966, Ser. No. 600,365
Claims priority, application Japan, Dec. 14, 1965, 40/76,438; Aug. 30, 1966, 41/56,666, 41/56,667
Int. Cl. C07f 7/26
U.S. Cl. 260—437     7 Claims This invention relates to an improved process for preparing a mixture of methyl and ethyl lead tetraalkyl compounds including the methyl-ethyl lead compounds, i.e., a mixture of tetramethyllead, trimethylmonoethyllead, dimethyldiethyllead, monomethyltriethyllead and tetraethylelad (hereinafter to be referred to as a tetraalkyllead mixture), the mixture being obtained from a tetraalkyllead compound containing as the alkyl radicals methyl and ethyl by the alkyl exchange reaction in the presence of a catalyst.

The tetraalkyllead mixture is very effective as an antiknock agent to be used as an additive for automotive and aircraft gasoline. As a process for its preparation, the process by means of the alkyl exchange reaction is known, wherein as catalyst is used either a Lewis acid, such as anhydrous aluminum chloride, or boron trifluoride etherate, aluminum silicate or the zeolites. The process which uses anhydrous aluminum chloride as catalyst has however numerous shortcomings such as that the catalyst readily reacts with the moisture and oxygen contained in the atmosphere and also that the reaction with the tetraalkyllead is too violent. The process in which boron trifluoride etherate is used as catalyst is somewhat more satisfactory, but possesses shortcoming with respect to the recovery of the catalyst as well as in other respects. On the other hand, aluminum silicate is an excellent catalyst, but it also has its faults with respect to its recovery and regeneration.

The object of this invention is to eliminate the foregoing shortcomings and to provide a process for the preparation of a tetraalkyllead mixture, which can be carried out with ease and to economic advantage.

The foregoing object of this invention can be achieved by carrying out the alkyl exchange reaction using as starting material either (1) a mixture of tetramethyllead and tetraethyllead, (2) a tetraalkyllead compound having methyl and ethyl in the same molecule, (3) a mixed tetraalkyllead compound having methyl and ethyl in the same molecule or (4) other mixture customarily used in the art, and as catalyst a metal salt of a strongly acid cationic exchange resin.

As the strongly acid cationic exchange resin to be used as the starting material for preparing the catalyst of this invention, those having the sulfonic acid group ($SO_3H$) are suitable, but the hydroxyl group may also be contained. This resin is preferably one which is porous and resistant to heat as well as organic solvents, and further has a configuration such that its surface area per unit weight is a maximum, as in the case of a small spheroid or a small amorphous lump. Specific examples include the copolymers of divinyl benzene and styrene, for example, Amberlyst 15 and the wide variety of amberlites, Dowex 250W, and Diaion SK 1B, SK 1A, SK 102 and SK 110.

The catalyst used in this invention is an aluminum, lead, calcium, magnesium, zinc, iron, mercury, tin, copper, silver, barium, lithium, sodium, potassium or bismuth salt of the aforesaid strongly acid cationic exchange resin or a mixture of these salts. These metal salts are readily obtained by customary procedures; namely, by flowing an aqueous solution of a water-soluble salt such, for example, as $AlCl_3 \cdot 6H_2O$, $Al(NO_3)_3 \cdot 9H_2O$, $Pb(NO_3)_2$, $CaCl_2 \cdot 6H_2O$, $MgCl_2 \cdot 6H_2O$, $ZnCl_2$, $FeCl_3 \cdot 6H_2O$, $Hg(CH_3COO)_2$, $SnCl_2 \cdot 2H_2O$, $CuSO_4 \cdot 5H_2O$, $AgNO_3$, $BaCl_2 \cdot 2H_2O$, $LiCl$, $NaCl$, $KCl$ and $Bi(No_3)_3 \cdot 5H_2O$, down a column packed with the aforesaid strongly acid cationic exchange resin. If aqueous solutions of two or more classes of salts are flowed down in this case, a salt is obtained in which different classes of metals are contained in a single resin. The composition which is obtained by flowing aqueous solutions of different metal salts down a plurality of separate columns packed with a strongly acid cationic exchange resin is also useful as a catalyst of this invention. However, preferred is that in which the different classes of metals are present together in a single resin, as in the former case. Aside from these, the salt obtained by mixing an aqueous solution of a metal hydroxide with an H type cationic exchange resin thereby effecting the neutralization of the latter is also useful as a catalyst in this invention.

Specific modes of preparing the catalyst are given below, wherein the parts are on a weight basis unless otherwise noted.

(1) A solution of 20 parts aluminum chloride ($AlCl_3 \cdot 6H_2O$) in 180 parts of water is flowed over a period of one hour down a column packed with 10 parts by volume of an H type strongly acid cationic exchange resin and thereafter washed with water to obtain an aluminum salt of the strongly acid cationic exchange resin.

(2) A solution of 8 parts of aluminum nitrate ($Al(NO_3)_3 \cdot 9H_2O$) and 1.4 parts of lead nitrate in 100 parts of water is flowed down a column packed with one part by volume of an H type strongly acid cationic exchange resin at the rate of 15 parts per hour, followed by washing with water, whereupon is obtained a mixed salt of aluminum and lead of the strongly acid cationic exchange resin.

(3) Ten parts by volume of a Na type strongly acid cationic exchange resin are packed in a column, down which are then flowed 250 parts by volume of 15% aqueous solution of $Pb(NO_3)_2$ over a period of 2 hours, followed by washing with water to obtain a lead salt of the strongly acid cationic resin.

(4) Ten parts by volume of an H type cationic exchange resin and 100 parts by volume of 2% NaOH aqueous solution are mixed and thereafter washed with water, whereupon a Na salt of the strongly acid cationic exchange resin is obtained.

Of the various metal salts of strongly acid cationic exchange resin obtained as hereinbefore described, the aluminum salt is the most effective for practicing this invention, the tin and lead salts being the next best. As regards the catalyst containing two or more metal salts together, those in which either aluminum, tin or lead salts are present in abundance are more effective. Further, if $n$ is the ionic value of the metal, then 1 to $n$ units of sulfonic acid groups contained in the strongly acid cationic exchange resin can bond with one unit of said metal atom. Any of these salts or mixtures thereof may be used as the catalyst of this invention. For instance, the aluminum salts of the strongly acid cationic exchange resin may be either that in which 3 sulfonic acid groups are contained per one aluminum atom, that in which 2 sulfonic acid groups are contained per one aluminum atom or that in which one sulfonic acid group is contained per one aluminum atom. Mixtures of these salts are also usable.

Prior to using these metal salts of hydrous strongly acid cationic exchange resin, their water content is preferably removed by drying at 50–110° C. or by boiling with such solvents as toluene and benzene.

The ratio of the methyl radical and the ethyl radical in the tetraalkyllead compound to be used as the starting material in this invention must be identical to that of the intended tetraalkyllead mixture. Further, the tetramethyllead and/or tetraethyllead may contain an inert solvent such as kerosene and a scavenger such as ethylene dichloride and ethylene dibromide.

In practicing this invention, the material tetraalkyllead compounds, after being prepared into a suitable composition, are advantageously passed continuously through a reaction tower packed with the catalyst, at a temperature of 10–110° C., preferably 20–70° C. As the reaction tower, a single or multistage tower equipped with a heating jacket to be heated with a heating media such as, say, steam or hot water can be used. Again, the batchwise method wherein the reaction is carried out while stirring the catalyst and material tetraalkyllead compounds in the reaction vessel at the foregoing temperature is also possible. In this case, the reaction product can be readily isolated by means of simple filtration and the catalyst remaining behind can be used immediately for the subsequent reaction.

While the catalyst used in this invention is stable and can stand use over a prolonged period of time, there are at times when the effectiveness of the catalyst is reduced due to an accumulation therein of the minute quantity of water and ions that are contained in the material tetraalkyllead. Hence, it is necessary either to feed the reaction tower with material from which the water and ions have been eliminated in advance or to subject the catalyst to a regeneration treatment after using it for a given period of time. The regeneration of the catalyst is carried out by the following steps, namely: washing it in toluene, then alcohol, followed by washing with water, treating with a caustic soda solution, again thoroughly washing with water, and thereafter flowing therethrough a fresh aqueous solution of a metal salt. Alternatively, it may be rendered into an H type strongly acid cationic exchange resin by treating with an acid, followed by flowing therethrough a fresh aqueous metal salt solution as hereinabove described.

According to this invention, the preparation, handling and management of the catalyst is easy and the reproducibility of the reaction course and results is satisfactory. Further, the life of the catalyst is semi-permanent, its recovery and regeneration is easy, the intended product is obtained quantitatively and the continuous method is possible. In addition, there are such advantages as that no dangerous decompositions of tetraalkylleads are set up, no especial considerations need be given to the matter of the corrosion of equipment, and no after treatment steps are required for the resulting tetraalkyllead mixture.

Generally speaking, it can be regarded that the alkyl exchange reaction comprises taking optionally four radicals from the very numerous methyl and ethyl radicals present in the materials and effecting the rebonding of the aforesaid four radicals with the lead atom. Hence, the ratio of the aforesaid five classes of tetraalkylleads in the resulting mixture is determined by means of probability from the ratio between the number of methyl radicals and the number of ethyl radicals. For instance, when the methyl and ethyl radicals are equal in number, the theoretical composition of the resulting tetraalkyllead mixture becomes 6.25 mol percent (5.66% by weight) tetramethyllead, 25.0 mol percent (23.82% by weight) trimethylmonoethyllead, 37.5 mol percent (37.5% by weight) dimethyldiethyllead, 25.0 mol percent (26.18% by weight) monomethyltriethyllead, and 6.25 mol percent (6.84% by weight) tetraethyllead. In actual practice however, values somewhat differing from these theoretical values are obtained, as shown in the hereinafter given examples, on account of the difference in the reactivity of the several tetraalkylleads.

The following nonlimitative examples are given for further illustrating this invention. Unless otherwise specified, the parts therein are on a weight bases. The composition of the resulting tetraalkyllead mixture was determined by gas chromatography and was shown in weight percent. The strongly acid cationic exchange resin used in the examples was in all cases "Amberylst" 15.

Examples 1–15

Five parts by volume of a salt of the strongly acid cationic exchange resin of a metal indicated in Table I were used as catalyst, and the alkyl exchange reaction was carried out by heating at 50° C. with stirring 8 parts of an equimolar mixed solution of tetramethyllead and tetraethyllead. The time required was shown in Table I.

TABLE I

| Example | Metal | Reaction time required (hr.) |
|---|---|---|
| 1 | Li | 5.0 |
| 2 | Na | 6.0 |
| 3 | K | 6.5 |
| 4 | Cu | 5.0 |
| 5 | Ag | 5.5 |
| 6 | Mg | 6.0 |
| 7 | Ca | 4.5 |
| 8 | Ba | 3.6 |
| 9 | Zn | 6.0 |
| 10 | Hg | 27.0 |
| 11 | Sn | 1.6 |
| 12 | Pb | 1.8 |
| 13 | Bi | 4.0 |
| 14 | Fe | 8.0 |
| 15 | Sn-Pb | 1.7 |

In Example 1, after completion of the reaction, the catalyst was separated from the reaction mixture by means of filtration to obtain 8 parts of a tetraalkyllead mixture whose composition was 4.9% tetramethyllead, 25.7% trimethylmonoethyllead, 40.8% dimethyldiethyllead, 24.3% monomethyltriethyllead and 4.3% tetraethyllead. The ratio of the several tetraalkylleads contained in the mixtures obtained in Examples 2–15 were practically the same as that of the mixture obtained in Example 1.

Example 16

Five parts by volume of a tin salt of the strongly acid cationic exchange resin were used as the catalyst, and 9 parts of an equimolar mixed solution of tetraethyllead and tetramethyllead containing 20% of toluene based on the tetramethyllead were heated at 60° C. with stirring. The alkyl exchange reaction was completed in an hour. Upon separating the catalyst from the reaction mixture by filtration, 8.9 parts of a toluene-containing tetraalkyllead mixture were obtained. The ratio of the several tetraalkylleads contained in this mixture was practically the same as that of the mixture obtained in Example 1.

Example 17

When 8 parts of a mixed solution of tetramethyllead and tetraethyllead (containing 25 mol percent of tetramethyllead) were heated at 50° C. with stirring, using as catalyst 5 parts by volume of a lead salt of the strongly acid cationic exchange resin, the alkyl exchange reaction was completed in 1.8 hours. Upon separation of the catalyst from the reaction mixture by filtration, 8 parts of a tetraalkyllead mixture were obtained, whose composition was 0.2% tetramethyllead, 3.8% trimethylmonoethyllead, 21.4% dimethyldiethyllead, 46.6% monomethyltriethyllead and 28.0% tetraethyllead.

Example 18

When a mitxure of 25.5 parts of tetramethyllead, 30.7 parts of tetraethyllead, 6.2 parts of toluene, 18.8 parts of ethylene dichloride and 17.9 parts of ethylene dibromide was heated at 60° C. with stirring, using as catalyst 48 parts by volume of a lead salt of the strongly acid cationic exchange resin, the alkyl exchange reaction was completed in 1.1 hours. Upon separation of the catalyst from the reaction mixture by filtration, 99 parts of a tetraalkyllead mixture containing toluene, ethylene dichloride and ethylene dibromide were obtained. The ratio of the several tetraalkylleads contained in this mixture was practically the same as that of the mixture obtained in Example 1, there being no change whatsoever in the ratio of the toluene, ethylene dichloride and ethylene dibromide, it being the same as that prior to the reaction.

Further, substantially identical results were obtained when as the catalyst a tin salt of the strongly acid cationic exchange resin was used.

Example 19

Example 12 was repeated except that as the starting material 8 parts of an equimolar mixed solution of trimethylmonoethyllead and monomethyltriethyllead were used instead of the mixed solution of tetramethyllead and tetraethyllead, with the result that 8 parts of a tetraalkyllead mixture were obtained, whose composition was practically identical to that of the mixture obtained in Example 1.

On the other hand, when 6.5 parts of dimethyldiethyllead were used, but otherwise the same procedures hereinabove described were followed, 6.5 parts of a tetraalkyllead mixture having a composition practically the same as that of the mixture obtained in Example 7 were obtained.

Further, substantially the same results were obtained when a tin salt of the strongly acid cationic exchange resin was used as catalyst.

Example 20

When the experiment was operated as in Example 12 but using as the reaction temperature 30° C., the alkyl exchange reaction was completed in 8 hours. The composition of the resulting tetraalkyllead mixture was practically identical to that of the mixture obtained in Example 1.

Example 21

One part by volume of a lead salt of the strongly acid cationic exchange resin was packed in a column equipped with a heating jacket and cooling tubes for cooling the tetraalkyllead mixture that flows out. While heating the column at 50° C., an equimolar mixed solution of tetramethyllead and tetraethyllead was then flowed down the column at the rate of 0.6 part by volume per hour. The catalytic capacity of the lead salt of the resin did not decline even when the amount of the material mixed solution treated reached 1000 parts by volume. A tetraalkyllead mixture in an amount equal to that of the material was obtained, and its composition was practically the same as that of the mixture obtained in Example 1.

Examples 22–38

The alkyl exchange reaction was carried out by heating at 50° C. with stirring 132 parts of an equimolar mixed solution of tetramethyllead and tetraethyllead, using as catalyst 5 parts by volume of a salt of a strongly acid cationic exchange resin of a metal indicated in Table II. The time required for the reaction is shown in Table II.

TABLE II

| Example | Catalyst Metal | Al content, percent | Time required (hr.) |
| --- | --- | --- | --- |
| 22 | Al–Li | 70 | 4.3 |
| 23 | Al–Na | 70 | 4.3 |
| 24 | Al–K | 70 | 4.3 |
| 25 | Al–Cu | 80 | 3.8 |
| 26 | Al–Ag | 80 | 3.8 |
| 27 | Al–Mg | 80 | 3.8 |
| 28 | Al–Ca | 80 | 3.8 |
| 29 | Al–Ba | 80 | 3.8 |
| 30 | Al–Zn | 80 | 3.8 |
| 31 | Al–Hg | 70 | 4.4 |
| 32 | Al–Sn | 10 | 22.0 |
| 33 | Al–Sn | 80 | 3.7 |
| 34 | Al–Pb | 5 | 28.0 |
| 35 | Al–Pb | 80 | 3.7 |
| 36 | Al–Pb¹–Sn | 60 | 5.0 |
| 37 | Al–Bi | 80 | 3.8 |
| 38 | Al–Fe | 80 | 3.8 |

¹ Pb content was 20%.

In Example 22, upon separation of the catalyst from the reaction mixture after completion of the reaction, a tetraalkyllead mixture having a composition of 4.9% tetramethyllead, 25.8% trimethylmonoethyllead, 40.3% dimethyldiethyllead, 24.7% monomethyltriethyllead and 4.3% tetraethyllead was obtained. The ratio of the several tetraalkylleads contained in the mixtures obtained in Examples 23–38 were practically the same as that of the mixture obtained in Example 22. As regards the Al content in Table II, this indicates the percentage of the total sulfonic acid groups in the cationic exchange resin which participate in the bond with the aluminum. The Pb content has the same meaning.

Example 39

When 141.8 parts of a mixed solution of tetramethyllead and tetraethyllead (content of the tetramethyllead 25 mol percent) were heated at 50° C. with stirring, using 5 parts by volume of an aluminum-lead salt (Al content 80%) of the strongly acid cationic exchange resin as catalyst, the alkyl exchange reaction was completed in 3 hours. Upon separating the catalyst from the reaction product, 141 parts of a tetraalkyllead mixture were obtained. The composition of this mixture was 0.2% tetramethyllead, 3.7% trimethylmonoethyllead, 21.8% dimethyldiethyllead, 46.2% monomethyltriethyllead and 28.1% tetraethyllead.

Example 40

When 155 parts of an equimolar mixed solution of tetraethyllead and tetramethyllead containing 20% of toluene based on the tetramethyllead were heated at 60° C. with stirring, using 5 parts by volume of an aluminum-lead salt (Al content 80%) of the strongly acid cationic exchange resin as catalyst, the alkyl exchange reaction was completed in 2 hours. Upon separating the catalyst from the reaction mixture by filtration, 154 parts of a toluene-containing tetraalkyllead mixture were obtained. The ratio of the tetraalkylleads contained in this mixture was practically the same as that of the mixture obtained in Example 22.

Example 41

When a mixed solution consisting of 25.5 parts of tetramethyllead, 30.7 parts of tetraethyllead, 6.2 parts of toluene, 18.8 parts of ethylene dichloride and 17.9 parts of ethylene dibromide was heated at 60° C. with stirring, using as catalyst 5 parts by volume of an aluminum-lead salt (Al content 80%) of the strongly acid cationic exchange resin, the alkyl exchange reaction was completed in 2.5 hours. Upon separating the catalyst from the reaction mixture by filtration, 99.5 parts of a tetraalkyllead mixture containing toluene, ethylene dichloride and ethylene dibromide were obtained. The ratio of the several tetraalkylleads contained in this mixture was practically the same as that of the mixture obtained in Example 22. There was no change whatsoever in the content of toluene, ethylene dichloride and ethylene dibromide, the ratio of these components being the same as that before the reaction.

Further, substantially similar results were obtained when an aluminum-tin salt (Al content 80%) of the strongly acid cationic exchange resin was used as catalyst.

Example 42

Example 35 was repeated excepting that as the starting material were used 126 parts of an equimolar mixed solution of trimethylmonoethyllead and monomethyltriethyllead instead of the mixed solution of tetramethyllead and tetraethyllead, with the result that 125.5 parts of a tetraalkyllead mixture were obtained. The composition of this mixture was practically the same as that of the mixture obtained in Example 22.

On the other hand, when 100 parts of dimethyldiethyllead were used as the starting material, but the procedure described above was otherwise followed, 99 parts of a tetraalkyllead mixture having practically the same composition as that of the mixture obtained in Example 22 were obtained.

Further, substantially similar results were obtained when an aluminum-tin salt (Al content 80%) of the strongly acid cationic exchange resin was used as catalyst.

Example 43

Using as catalyst an aluminum-lead salt (Al content 80%) of the strongly acid cationic exchange resin and a reaction temperature of 30° C., the experiment was otherwise carried out as in Example 22, with the result that the alkyl exchange reaction was completed in 15 hours. The composition of the resulting tetraalkyllead mixture was practically the same as that of the mixture obtained in Example 22.

Example 44

One part by volume of an aluminum-lead salt (Al content 80%) of the strongly acid cationic exchange resin was packed in a column equipped with a heating jacket and cooling tubes for cooling the tetraalkyllead mixture to be discharged. An equimolar mixed solution of tetramethyllead and tetraethyllead was then flowed down the column at the rate of 6 parts by volume per hour while heating the column at 50° C. The catalytic capacity of the resin salt did not decline even when the amount treated of the material mixed solution reached 1000 parts by volume. A tetraalkyllead mixture in an amount equal to that of the material was obtained, the composition of which was practically the same as that of the mixture obtained in Example 22.

Example 45

When 60 parts of tetramethyllead and 72 parts of tetraethyllead were heated at 50° C. with stirring, using as catalyst 4 parts by volume of an aluminum salt of the strongly acid cationic exchange resin, the alkyl exchange reaction was completed in 3 hours. Upon separating the catalyst from the reaction product, 131 parts of a tetraalkyllead mixture were obtained. This mixture had a composition of 5.0% tetramethyllead, 25.7% trimethylmonoethyllead, 40.7% dimethyldiethyllead, 24.4% monomethyltriethyllead and 4.2% tetraethyllead.

Example 46

When 31.5 parts of tetramethyllead and 110.3 parts of tetraethyllead were heated at 50° C. with stirring, using as catalyst 4 parts by volume of an aluminum salt of the strongly acid cationic exchange resin, the alkyl exchange reaction was completed in 3 hours. Upon separating the catalyst from the reaction product by filtration, 140 parts of a tetraalkyllead mixture were obtained. The composition of this mixture was 0.3% tetramethyllead, 4.3% trimethylmonoethyllead, 20.2% dimethyldiethyllead, 43.1% monomethyltriethyllead and 32.1% tetraethyllead.

Example 47

When 72 parts of tetraethyllead and 75 parts of tetramethyllead containing 20% of toluene were heated at 60° C. with stirring, using as catalyst 2 parts by volume of an aluminum salt of the strongly acid cationic exchange resin, the alkyl exchange reaction was completed in 2.5 hours. 146 parts of a 10.5% toluene-containing tetraalkyllead mixture were obtained upon separation of the catalyst from the reaction product. The ratio of the several tetraalkylleads in this mixture was practically the same as in Example 45.

Example 48

When 25.5 parts of tetramethyllead, 30.7 parts of tetraethyllead, 6.2 parts of toluene, 18.8 parts of ethylene dichloride and 17.9 parts of ethylene dibromide were heated at 60° C. with stirring, using as catalyst 4 parts by volume of an aluminum salt of the strongly acid cationic exchange resin, the alkyl exchange reaction was completed in 2.5 hours. Upon separation of the catalyst from the reaction product by filtration, 99 parts of a tetraalkyllead mixture containing toluene, ethylene dichloride and ethylene dibromide were obtained. The several tetraalkylleads were contained in this mixture in practically the same ratio as in the case of Example 45, while the toluene, ethylene dichloride and ethylene dibromide were present in the same ratio as before the reaction.

Example 49

The procedures described in Example 45 were followed, except that 60 parts of trimethylmonoethyllead and 66 parts of monomethyltriethyllead were used, with the result that 126 parts of a tetraalkyllead mixture were obtained. The composition of this mixture was practically the same as that of the mixture obtained in Example 45.

When 100 parts of dimethyldiethyllead were used as the tetraalkyllead, 98.5 parts of a tetraalkyllead mixture having practically the same composition as in the case of Example 45 was obtained in like manner.

Example 50

When a reaction temperature of 30° C. was used in the procedure described in Example 45, the alkyl exchange reaction was completed in 11 hours. The composition of the resulting tetraalkyllead mixture was practically the same as that of the mixture obtained in Example 45.

Example 51

One part by volume of an aluminum salt of the strongly acid cationic exchange resin was packed in a column equipped with a heating jacket and cooling tubes for cooling the tetraalkyllead mixture to be discharged, after which an equimolar mixture of tetramethyllead and tetraethyllead was flowed down the column at the rate of 7 parts by volume per hour while heating the column at 50° C. The catalytic capacity of the aluminum salt of the strongly acid cationic exchange resin did not decline even when the amount treated of the equimolar mixed solution of tetramethyllead and tetraethyllead reached 1000 parts by volume. The amount of the resulting tetraalkyllead mixture was equal to the foregoing amount treated, and the composition of the product was practically the same as that of the mixture obtained in Example 45.

What is claimed is:

1. In a process for preparing by means of the alkyl exchange reaction a mixture of methyl and ethyl lead tetraalkyl compounds including the methyl-ethyl lead compounds, the improvement which comprises using as catalyst a metal salt of a strongly acid cationic exchange resin, said metal being selected from the group consisting of aluminum, tin, lead, lithium, sodium, potassium, copper, silver, magnesium, calcium, barium, zinc, mercury, bismuth and iron.

2. The process according to claim 1 wherein a mixture of tetramethyllead and tetraethyllead is used as the starting material of the alkyl exchange reaction.

3. The process according to claim 1 wherein a mixture of methyl-ethyl lead tetraalkyl compounds is used as the starting material of the alkyl exchange reaction.

4. The process according to claim 1 wherein a methyl-ethyl lead tetraalkyl compound is used as the starting material of the alkyl exchange reaction.

5. The process according to claim 1 wherein a mixture of tetramethyllead and methyl-ethyl lead tetraalkyl compounds is used as the starting material of the alkyl exchange reaction.

6. The process according to claim 1 wherein a mixture of tetraethyllead and methyl-ethyl lead tetraalkyl compounds is used as the starting material of the alkyl exchange reaction.

7. The process according to claim 1 wherein said alkyl exchange reaction is effected at a temperature ranging between 10° and 110° C.

References Cited

UNITED STATES PATENTS

| 2,270,108 | 1/1942 | Calingaert et al. | 260—437 |
| 3,158,636 | 11/1964 | Wall | 260—437 |
| 3,231,511 | 1/1966 | Closson | 252—386 |

PATRICK P. GARVIN, *Primary Examiner.*

U.S. Cl. X.R.

44—69; 252—386, 431